Oct. 20, 1925.

W. B. EARNSHAW 1,557,995

INTERNAL COMBUSTION ENGINE PISTON

Filed Oct. 18, 1923

Patented Oct. 20, 1925.

1,557,995

UNITED STATES PATENT OFFICE.

WILLIAM B. EARNSHAW, OF DAYTON, OHIO, ASSIGNOR TO GENERAL MOTORS RESEARCH CORPORATION, OF DAYTON, OHIO, A CORPORATION OF DELAWARE.

INTERNAL-COMBUSTION-ENGINE PISTON.

Application filed October 18, 1923. Serial No. 669,244.

*To all whom it may concern:*

Be it known that I, WILLIAM B. EARNSHAW, a citizen of the United States of America, residing at Dayton, county of Montgomery, and State of Ohio, have invented certain new and useful Improvements in Internal-Combustion-Engine Pistons, of which the following is a full, clear, and exact description.

The present invention relates to pistons for internal-combustion engines and more particularly to so-called "two-piece" pistons.

Among the objects of the invention is a piston having simplicity of design, efficiency in performance, and economy in manufacture.

Another object of the invention is a bimetallic two-piece piston having the heat characteristics of a piston made of one of the metals and the expansion characteristics of a piston made of the other of the metals.

Further objects and advantages of the present invention will be apparent from the following description, reference being had to the accompanying drawings, wherein a preferred form of embodiment of the present invention is clearly shown.

Figure 1:
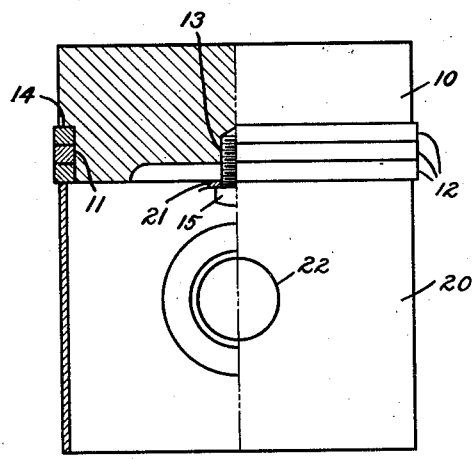
Fig. 1 is a view in elevation, partly in section, of the piston.
Figure 2:
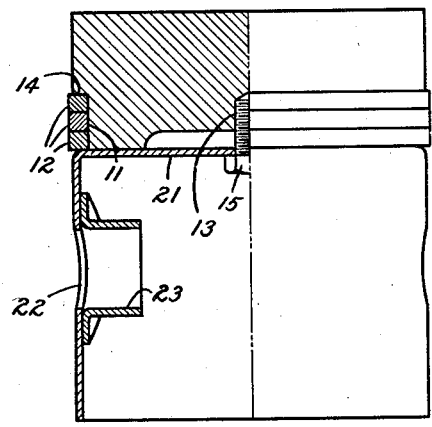
Fig. 2 is a view similar to Fig. 1 but at right angles thereto.
Figure 3:
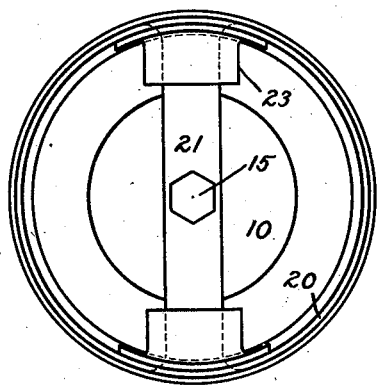
Fig. 3 is a bottom plan view of the piston.

Referring to the drawings, the piston is shown as formed of separate head and skirt portions, 10 and 20 respectively, joined together by means of a screw 15.

The head portion 10 is a cylindrical block preferably of aluminum provided with a reduced portion 11 serving as a groove for a plurality of rings 12 and providing a shoulder 14 against which the upper ring abuts when the parts are secured together. The underside of head 10 is provided centrally with a threaded hole 13 for the reception of the screw 15.

The skirt portion 20 is in the form of a stamped cylindrical member of sheet iron or steel having a slightly larger diameter than that of head 10 and having parts of its upper end cut out leaving a bridge 21 through which screw 15 extends into hole 13 to secure the parts together.

Skirt 20 is also provided with holes 22 around which upon the inside of the skirt are secured in any suitable manner bushings 23 serving as pin bosses. Bushings 23 are secured to skirt 20 preferably by welding or brazing.

It will be noted that rings 12 may be placed upon the piston by separating the parts and slipping the rings over the reduced portion of head 10. This is advantageous in that there is no necessity in unduly expanding the ring in slipping it over the head as is ordinarily done. Again the present invention permits the reforming of the ring groove when the latter becomes worn simply by turning off a portion of the underside of the head 10. Further, the design permits the use in a single groove of several thin rings of deeper section, giving a more efficient packing with less friction upon the cylinder walls. All of which present advantages over the present generally used piston types.

While the present invention contemplates the use of aluminum and iron or steel, other metals can undoubtedly be used with good effect and while the form shown is the preferred this may be varied without departing from the scope of the claim which follows.

What I claim is as follows:

A piston for internal-combustion engines, comprising an aluminum head in the form of a cylindrical block having a portion of reduced diameter; a sheet metal skirt of larger diameter than the head, the reduced head portion and the upper end of the skirt forming a groove for a plurality of packing rings; pin bosses secured in said skirt; and means for securing the head and skirt together.

In testimony whereof I hereto affix my signature.

WILLIAM B. EARNSHAW.